Figure 1:
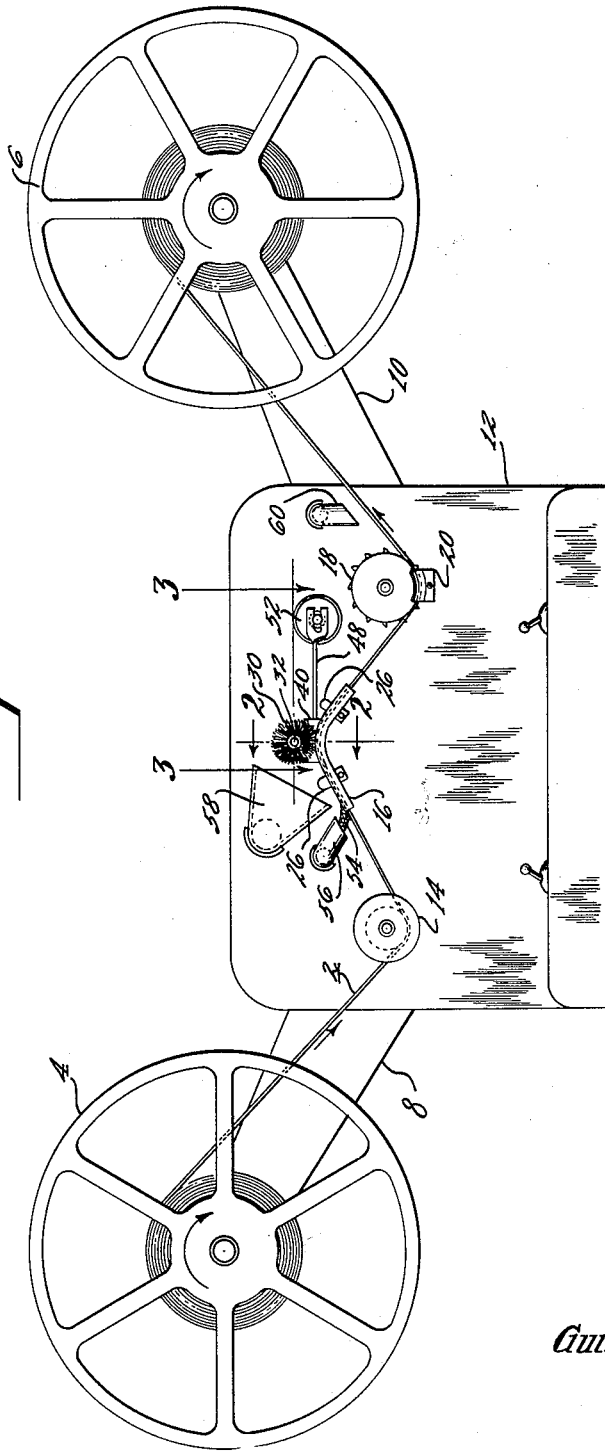

March 8, 1960  G. A. DEL VALLE  2,927,553
APPARATUS FOR PROCESSING MOTION PICTURE FILM
Filed Jan. 31, 1952  2 Sheets-Sheet 1

INVENTOR
Guillermo A. Del Valle
BY
ATTORNEY

March 8, 1960  G. A. DEL VALLE  2,927,553
APPARATUS FOR PROCESSING MOTION PICTURE FILM
Filed Jan. 31, 1952  2 Sheets-Sheet 2
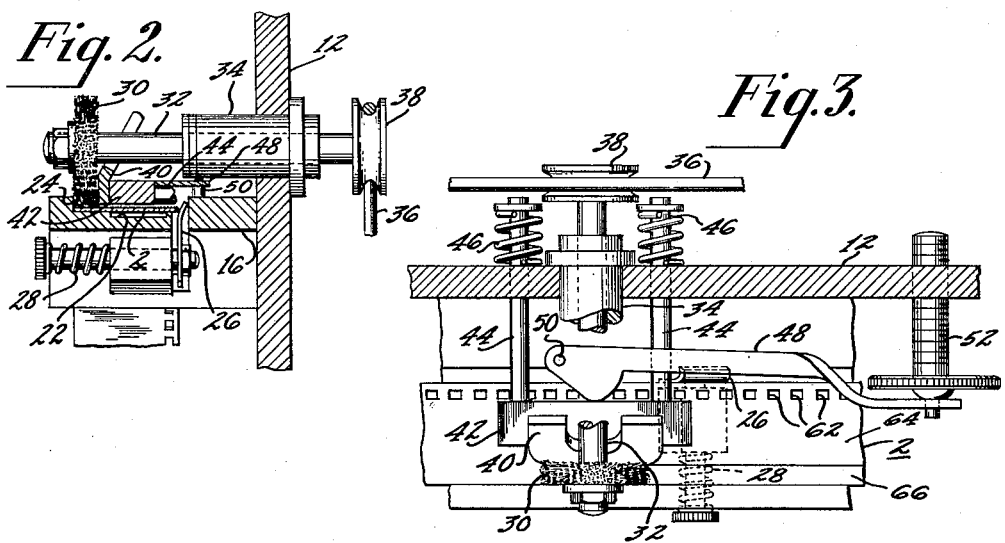
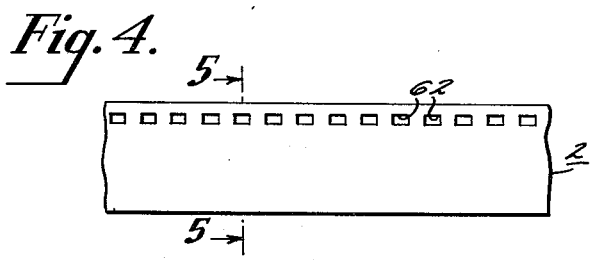
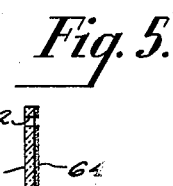
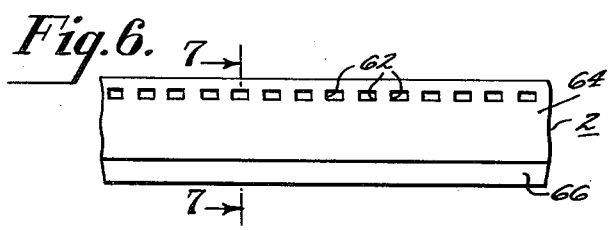
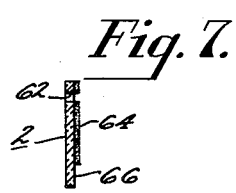
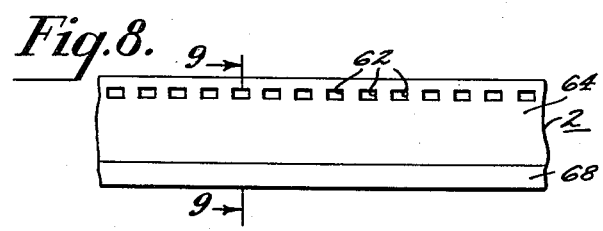
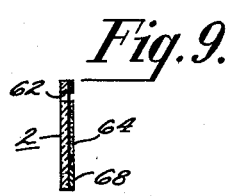
INVENTOR
Guillermo A. Del Valle
BY
ATTORNEY United States Patent Office 2,927,553
Patented Mar. 8, 1960

2,927,553
APPARATUS FOR PROCESSING MOTION PICTURE FILM

Guillermo A. del Valle, Merchantville, N.J., assignor to Radio Corporation of America, a corporation of Delaware Application January 31, 1952, Serial No. 269,153

10 Claims. (Cl. 118—102)

This invention relates to film processing apparatus and methods, and more particularly to a method of and apparatus for adding a sound track to motion picture film.

Recently, there has been developed a process for putting a strip of magnetizable material on motion picture film whereby the sound track accompanying the picture portion of the film may be in the form of a magnetic record, replacing the heretofore conventional optical sound track. The magnetizable material must, however, be applied directly to the base material of the film. It cannot be applied successfully over the photo sensitive emulsion. It has therefore been the practice to apply the magnetic material, in a narrow stripe, on the side of the film opposite from the emulsion side. Thus, as the film is fed through the film path of a conventional sound-motion picture projector, for example, the emulsion will be on the side of the film facing the projection lens, while the magnetic sound track will be on the side of the film facing the projection lamp.

With certain films and processes, the above outlined procedure is, to a certain extent satisfactory. However, there are other types of films and processes wherein the photosensitive emulsion on the final film occurs on the side of the film opposite to that upon which it occurs in the films and processes first mentioned. Nearly all of the "color" motion picture film is in this latter category. In order to obtain high quality copies of an original film, the duplicate film is exposed with its emulsion surface in contact with the emulsion surface of the original film. Now, it is immaterial to the quality of the projected picture whether the emulsion side of the film faces the projection lens or whether the emulsion side faces the lamp of a projector. Therefore, with copies of a film in the latter category, the film may be threaded into the projector with the emulsion side facing in the opposite direction from that in which the emulsion side of the original film would be facing. However, the magnetic transducer which is used to translate the signals on the magnetic sound track will always be on one side of the film.

Thus, if the projector has the transducer positioned to properly engage the sound track on the original film, with the heretofore conventional techniques, the transducer will not be in position to properly engage the sound track on the duplicate films since the sound track on the side of the film opposite from the emulsion will also be on the side of the film away from the transducer.

It is, therefore, an object of the present invention to provide a means for processing motion picture film whereby a magnetic sound track may be applied to the emulsion side of the film.

It is another object of the present invention to provide a method of processing motion picture film whereby a magnetic sound track is applied to the emulsion side of the film.

A further object of this invention is to provide a means for processing motion picture film in preparation for the application of a magnetic sound track on the emulsion side of the film.

In accomplishing these and other objects, there has been provided, in accordance with the present invention, a method of and apparatus for removing a portion of the photosensitive emulsion from the base of a strip of motion picture film, the portion removed corresponding to at least a part of the sound track area of the film. The emulsion is removed without damaging the surface of the base material. Thus, there is provided an area, on the emulsion side of the film, which is free from emulsion and whereon a magnetic sound track may then be applied.

A better understanding of this invention may be had from the following detailed description when read in connection with the accompanying drawings, wherein:

Fig. 1 is an elevational view of one form of apparatus constructed in accordance with the present invention, Fig. 2 is a cross-sectional view, taken along the line 2—2 of Fig. 1 and looking in the direction of the appended arrows, Fig. 3 is a cross-sectional view, partly broken away, taken along the line 3—3 of Fig. 1 and looking in the direction of the appended arrows, Fig. 4 is a view of a portion of film before it has been processed in accordance with the present invention, Fig. 5 is a cross-sectional view, taken along the line 5—5 of Fig. 4, Fig. 6 is a view similar to that shown in Fig. 4, but showing the film with a portion of the emulsion removed, Fig. 7 is a cross-sectional view, taken along the line 7—7 of Fig. 6 and looking in the direction of the appended arrows, Fig. 8 is a view similar to Figs. 4 and 6 but showing the film with a layer of magnetizable material in the place of the portion of emulsion which was removed, and Fig. 9 is a cross-sectional view, taken along the line 9—9 of Fig. 8 and looking in the direction of the appended arrows.

Referring to the drawings in more particularity, there is shown a machine constructed in accordance with the present invention wherein a length of film 2 is adapted to be reeled from a storage reel 4 to a take-up reel 6. The reels are supported by arms 8 and 10, respectively, which are, in turn, secured to a main frame or chassis 12 of the machine. The film 2 moves between the reels in a path determined by the elements secured to the chassis 12. First, there is a guide roller 14 under which the film passes. Next, there is a skid 16 followed by a driving sprocket 18. A sprocket shoe 20 is positioned adjacent to the sprocket in a manner to assure intimate contact between the sprocket and the film.

The skid 16 is positioned between the guide roller 14 and the sprocket 18 and slightly higher than the guide roller and the sprocket. The configuration of the skid is substantially that of an inverted V. This arrangement assures that the film 2 will pass over the skid without a transverse bow therein. In keeping with the requirements of the standards set up for film handling apparatus, the skid is under-cut to provide a recess 22 (see Fig. 2) whereby the picture portion of the film does not engage any stationary surface. The skid is also provided with a lip 24 on the forward edge to provide a steady guide for the edge of the film. Resilient guides 26 are provided to engage the opposite edge of the film in order to assure that the film will follow a predetermined path as it passes over the skid. Each of these guides is resiliently biased by a spring 28. Positioned above the apex of the V of the skid 16 is a rotary brush 30. The brush is mounted on a suitable shaft 32 which passes through a bearing 34. The bearing, in turn, is supported by the chassis 12. The brush may be driven by an electric motor (not shown) which may be coupled thereto, as by a belt 36 and pulley 38.

An adjustable brush guide or fence 40 is positioned adjacent to the brush 30 to restrict the width of the brush as will be fully described hereinafter. The fence 40 is mounted on a bar 42 which is supported on the chassis by a pair of rods 44. These rods are biased by a pair of springs 46. Adjustable means are provided whereby the fence may be set in a predetermined position. This adjusting means includes a lever 48 pivotally secured to the skid by means of a shaft 50 and an adjusting screw 52 which bears against the free end of the lever 48.

There is also provided a means for applying a wetting agent to the emulsion side of the film as it passes over the skid. This means includes a wick 54 which connects through a suitable tube 56 to a reservoir (not shown). Thus, at least a portion of the emulsion of the film is wetted by a wetting agent before the film arrives at the brush. The brush, when rotating, brushes the wet emulsion from the base material of the film. Positioned adjacent to the brush and supported by the main frame or chassis 12 is a means for collecting the particles of the emulsion removed from the base of the film brush 30. This collecting means includes a suction nozzle 58 which is connected by a suitable conduit (not shown) to a vacuum apparatus (not shown). There is also provided a drying means for the film which includes a warm air nozzle 60 positioned between the brush and the take-up reel 6.

The film is so fed through the apparatus that the emulsion side is up. The wick member 54 applies a wetting agent to the emulsion, thereby softening it. The wetted emulsion then passes the rotary brush which removes a strip of predetermined width of the emulsion from that portion of the film which corresponds to the sound track area. The width of the portion removed is controlled by the setting of the fence 40. By turning the adjusting screw 52, the fence 40 is moved in a direction transversely of the film. One side of the brush 30 bears against the fence which, in turn, is very slightly spaced from the surface of the film. The fence is movable with respect to the lip 24 which guides the edge of the film. Such movement thereby accurately controls the width of the area of contact between the brush and the film.

The particles of the emulsion removed by the brush are collected by the collecting means to prevent fouling the apparatus. When the emulsion is softened by the wetting agent, the brush may remove the emulsion from the base material without damaging the surface of the plastic base of the film. After the film has been subjected to the action of the brush, the film and the portion of the emulsion remaining thereon are dried by a stream of warm air flowing from the drying nozzle 60. The film is then wound upon a take-up reel.

The method of processing the film in accordance with the present invention may be more specifically described with reference to Figs. 4 to 9. The motion picture film 2, a portion of which is shown in Figs. 4 and 5, is provided with sprocket holes 62 along one edge and the entire surface is coated with a layer of photosensitive emulsion 64. The emulsion is wetted by a suitable wetting agent which may include water. After the emulsion has been wetted, a portion of the emulsion along the unperforated edge, corresponding to the sound track area 66, is removed leaving the bare plastic base material exposed. This step is illustrated in Figures 6 and 7. The film and the emulsion remaining thereon are then dried and a layer of magnetizable material 68 suitable for carrying a magnetic sound record is applied to the surface of the base material in the space previously occupied by that portion of the emulsion which was removed. Since the layer of magnetic material may be of substantially the same thickness as the emulsion coating, there is no need for a "balance track" along the perforated edge, a stripe of magnetic material which with conventional methods, is needed to permit the film to be wound evenly on reels.

There has thus been provided a means and a method of processing motion picture film whereby the film is adapted to carry a magnetic sound track on the emulsion side of the film.

What is claimed is:

1. Apparatus for processing motion picture film having a photosensitive emulsion on one side thereof comprising, in combination, film feeding means, guide means defining a path for said film, wetting means disposed contiguous to said path for applying a wetting agent adapted to soften said emulsion to at least a portion of the emulsion side of said film contiguous to one edge thereof, a brush positioned contiguous to said path for removing a portion of the wetted emulsion from said film, and adjustable means cooperating with said brush and adapted to compress said brush for adjusting said portion to be a strip of predetermined width, one edge of said strip being contiguous with said one edge of said film.

2. The invention as set forth in claim 1 wherein said brush is of a circular configuration and is rotatable.

3. The invention as set forth in claim 2 characterized by the addition of collecting means positioned adjacent to said brush for collecting the portion of said emulsion removed by said brush.

4. The invention as set forth in claim 3 wherein said collecting means comprises a suction nozzle.

5. The invention as set forth in claim 2 wherein said means cooperating with said brush includes a fence positioned adjacent to said path and to said brush.

6. The invention as set forth in claim 1 wherein said wetting means comprises a wick for applying said wetting agent to said film.

7. The invention as set forth in claim 1 characterized by the addition of drying means positioned adjacent to said path for drying the film and the remaining emulsion thereon subsequent to the removal of said portion.

8. The invention as set forth in claim 7 wherein said drying means includes a nozzle through which a stream of warm, dry air may be directed against said film.

9. Apparatus for processing photographic film having a photosensitive emulsion on one side thereof comprising, in combination, film feeding means, guide means defining a path for said film, wetting means disposed contiguous to said path for applying a wetting agent to at least a portion of the emulsion side of said film contiguous to one edge thereof, a circular, rotatable brush positioned contiguous to said path for removing a portion of the wetted emulsion from a strip of predetermined width contiguous to said one edge of said film, collecting means positioned adjacent to said brush for collecting the portion of said emulsion removed by said brush, a fence adjustably positioned adjacent to said brush and adapted to compress said brush for limiting and changing the width of said brush whereby the width of said strip is determinable, and drying means positioned adjacent to said path for drying the film and remaining emulsion thereon subsequent to the removal of said portion.

10. Apparatus for processing motion picture film having a photosensitive emulsion on one side thereof comprising means for feeding said film over a path, wetting means disposed along said path for applying a wetting agent adapted to soften said emulsion on a portion of the emulsion side of said film, means disposed along said path for removing said softened emulsion from the area of a strip of predetermined width on the emulsion side of said film adjacent to one edge thereof, said emulsion removing means including a brush positioned on said emulsion side of said film for sweeping an area thereof whereby said softened emulsion is removed therefrom, and adjustable means for compressing said brush so that the width thereof is equal to said predetermined width of said strip.

References Cited in the file of this patent

UNITED STATES PATENTS

| | | | |
|---|---|---|---|
| 758,923 | Knowlton | May 3, | 1904 |
| 1,300,656 | Scheiblein | Apr. 15, | 1919 |
| 1,321,421 | Delany | Nov. 11, | 1919 |
| 1,794,492 | Rendall | Mar. 3, | 1931 |
| 1,950,518 | Read | Mar. 13, | 1934 |
| 1,984,456 | Bonamico | Dec. 18, | 1934 |
| 2,262,281 | Hagler | Nov. 11, | 1941 |
| 2,263,131 | Hoza | Nov. 18, | 1941 |
| 2,541,136 | Warren | Feb. 13, | 1951 |
| 2,563,417 | Pessel | Aug. 7, | 1951 |